May 22, 1951         H. MARTIN         2,553,663

PISTON RING COMPRESSOR

Filed Feb. 16, 1948         2 Sheets-Sheet 1

Herman Martin, Inventor

By Cushman, Darby & Cushman
Attorneys

May 22, 1951     H. MARTIN     2,553,663
PISTON RING COMPRESSOR

Filed Feb. 16, 1948     2 Sheets-Sheet 2

Herman Martin,
Inventor
By Cushman, Darby & Cushman,
Attorneys

Patented May 22, 1951

2,553,663

UNITED STATES PATENT OFFICE 2,553,663

PISTON RING COMPRESSOR

Herman Martin, Bradford, England

Application February 16, 1948, Serial No. 8,699
In Great Britain February 5, 1947

Section 1, Public Law 690, August 8, 1946
Patent expires February 5, 1967

3 Claims. (Cl. 29—222)

This invention relates to piston ring compressors for compressing split piston rings when in position on pistons and facilitating the insertion of the latter into cylinder bores.

This operation has presented difficulties previously, when employing hitherto known methods, and the object of the present invention is to provide a new or improved construction of piston ring compressor which will enable the aforementioned operation to be carried out speedily, efficiently and conveniently.

According to the invention the compressor comprises a tapered sleeve of thin resilient durable material constructed in two parts detachably secured together, and having its internal diameter at the larger end just sufficiently large enough to be passed over the piston rings when the latter are on the piston in their uncompressed condition, and having its internal diameter at the smaller end of a size corresponding to the diameter of the rings when the latter are compressed sufficiently for entry of the piston into the cylinder bore.

According to a further feature of the invention the sleeve is formed from two sheets of thin material, one end of each sheet of material being detachably secured together by a quick-release joint whilst the other ends of each sheet overlap each other, these ends being held in overlapping relationship by means which permit the mean diameter of the sleeve to be adjusted and said overlapping ends being also connected or guided together by suitable guide members attached to or formed on one of the overlapping sheets.

The connecting or guiding together of the overlapping sheets preserves the taper of the sleeve in all positions of the latter.

The quick-release joint may take the form of a removable hinge pin passing through inter-engaging rolled ends of the sheets, and this detachable fastening enables the compressor to be quickly opened after the piston and its rings have been inserted into the cylinder bore, with the result that the compressor can be easily removed from around the connecting rod of the piston.

Re-insertion of the hinge pin causes the compressor to re-close and assume its previous shape and size, to be ready for compressing the piston rings upon the next piston for insertion.

In order that the invention may be clearly understood and readily carried into effect, the same will now be more fully described with reference to and by the aid of the accompanying drawings, in which—

Figure 1:
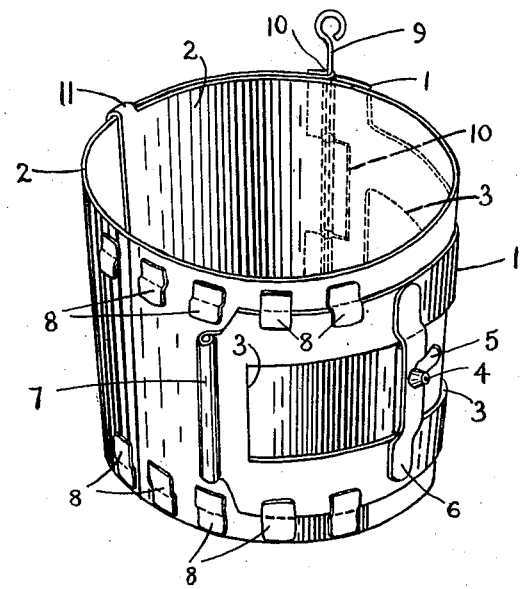
Figure 1 is an inverted perspective view of a piston ring compressor constructed according to the invention.
Figure 2:
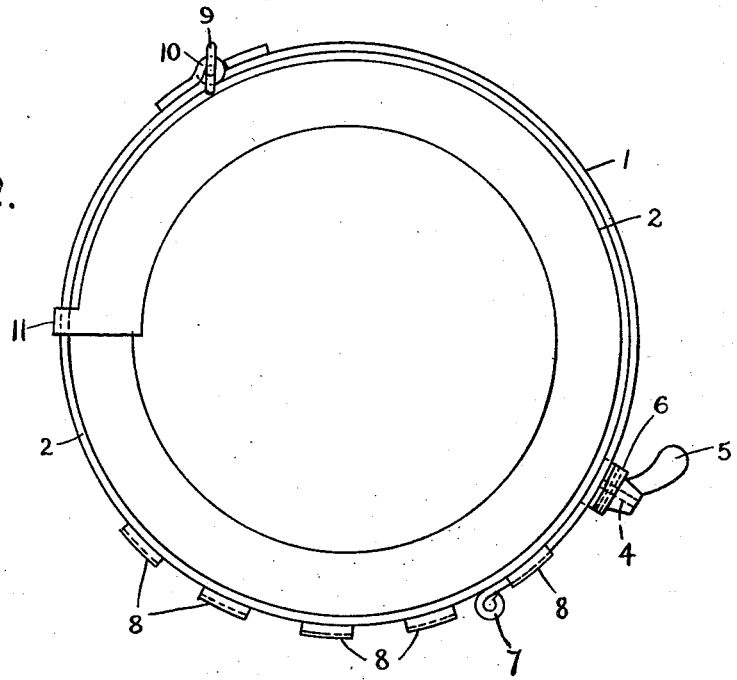
Figure 2 is an enlarged plan view of Figure 1.

In a preferred construction, the sleeve is formed from two strips of semi-spring steel, 1 and 2, about 0.0125 inches in thickness, the end of the strip 1 being formed with a slot 3 for co-action with a stud 4 secured to a portion of the strip 2 which is overlapped by the slotted end of the strip 1.

The stud 4 is screw-threaded to receive a wing nut 5 which urges a spring washer or its equivalent 6 into gripping contact with the slotted end of the strip 1, so that the mean diameter of the sleeve can be adjusted by slackening the wing nut 5. The shape of the washer is such that its pressure is applied at its extremities at the edges of the slotted strip 1, so enhancing the locking or gripping effect.

The extremity of the slotted end strip 1 can be provided with a rolled portion 7 to serve as a finger-grip to facilitate the making of an adjustment in the mean diameter of the sleeve, and the said slotted end strip may be of slightly less width than the overlapped portion 2 to pass through guides 8, spot welded or otherwise secured on the said overlapped portion of the strip 2. These guides 8 are formed so as to enclose the edges of the slotted overlapping portion 1.

At the overlapping portion of the sleeve the strips 1 and 2 have their adjacent ends connected together by means of a quick-release joint and securing pin 9. This pin 9 may either pass through inter-engaging turned over ends 10 of the strips, or alternatively through turned over and interengaging members secured to the sleeves by spot welding. The inner end of the overlapped portion of the sleeve may be provided with a clip or guide 11, which assists in holding the parts of the sleeve together while the hinge or securing pin 9 is being inserted.

In use the large diameter end of the tapered sleeve is slid over the piston, upon which the rings have already been placed in position, and the smaller diameter end presented to the cylinder bore. On pushing the piston through the sleeve the rings are compressed due to the taper of the sleeve, and the piston guided into the bore.

Figure 3:
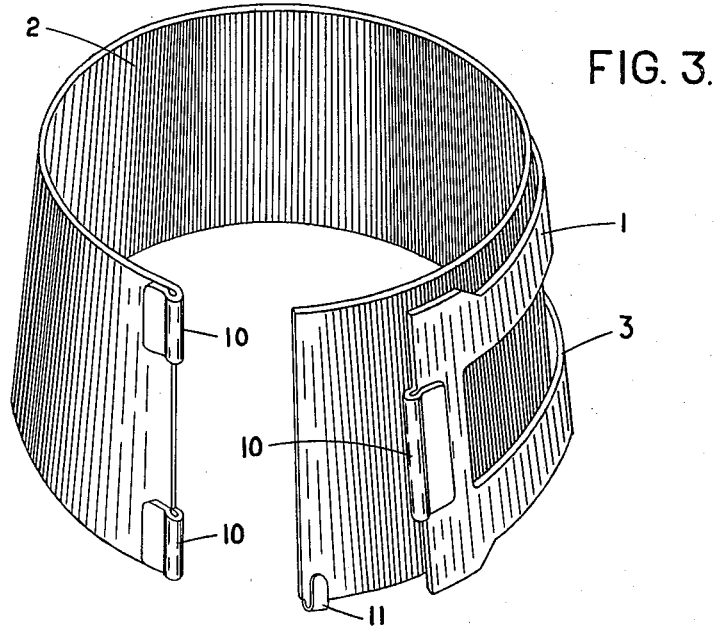
Figure 3 is a perspective view of a piston ring compressor with the hinge pin removed, as when the compressor is being removed from around a connecting rod.
Figure 4:
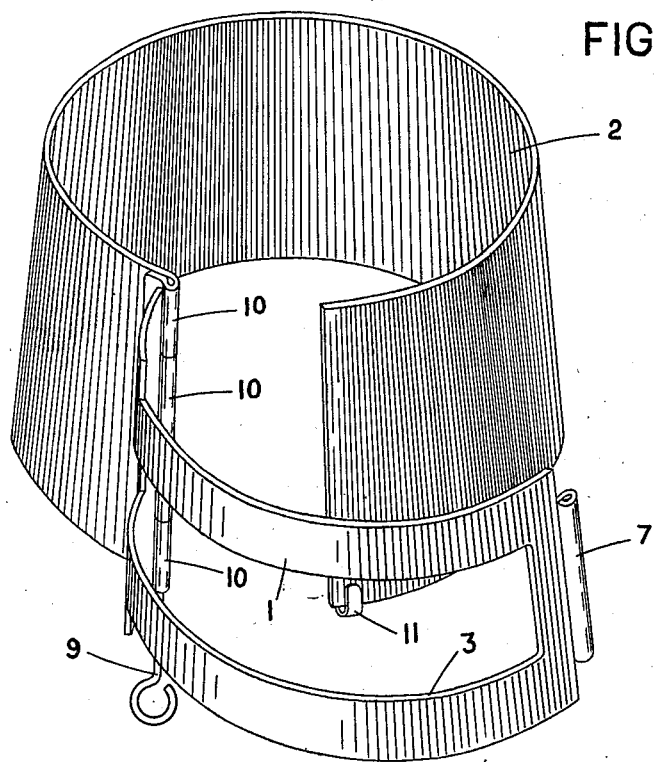
Figure 4 is a similar view to Figure 3, but showing the compressor opened ready for placing around a piston and piston rings.

Obviously, when the piston is being inserted from beneath the cylinder block, the sleeve is used with its smaller diameter end uppermost, whilst the reverse will be the case in instances where the piston is to be inserted from the top of the block. In either case, owing to the resilience of the material used, the sleeve can be distorted as necessary to enable it to be passed over the big end of the connecting rod attached to the piston. When this is impossible, it is only necessary to withdraw the hinge or securing pin 9 of the quick-release joint, release the clip or guide 11 from the overlapped portion of the sleeve, and the sleeve is open and easily removed from the connecting rod, as indicated by the view of the sleeve shown in Figure 3. In order to reclose the sleeve it is necessary only to engage the clip or guide 11 and replace the pin 9, and the sleeve then assumes its original form and diameter, ready for the next operation. Thus the original setting of the wing nut 5 suffices for all the pistons of a particular engine being assembled. The piston ring compressor can be opened up and reconnected or closed without disturbing the set dimension of the compressor, so as to avoid the necessity of further adjustment every time a piston is inserted into the cylinder. When the quick release joint is removed to permit the removal of the compression from around the connecting rod of the piston, it will be seen that when it is replaced, the compression is of the same dimension so that the compressor is ready for use on the second piston without any additional adjustment. Thus, when the compressor is used on a 6, 12 or more cylinder engine, the compressor has only to be adjusted once, with the result that it effects a substantial saving in time and labor.

Whilst it is preferable for the sleeve to be of semi-spring steel, it is obvious that it could be made from a thin sheet or sheets of resilient plastic or other suitable material.

I claim:

1. A piston ring compressor for facilitating the insertion of a piston into a cylinder bore comprising two sheets of thin resilient durable material, a quick-release non-adjustable joint for detachably securing said sheets together in abutting relationship of one end of each to form a flexible band having its ends adapted for overlapping relationship to form a tapered sleeve, and adjustable securing means for detachably engaging the overlapping ends with each other and setting the said sleeve at different diameters, at any of which settings the quick-release joint enables the sleeve to be opened and re-closed without disturbing the set dimension of the compressor and insuring uniform compression being exerted by the sleeve without requiring any further adjustment and without said quick release joint touching and interfering with the adjustment of the adjustable securing means.

2. A piston ring compressor for facilitating the insertion of a piston into a cylinder bore comprising two sheets of thin resilient durable material, interengaging rolled ends at one end of each sheet, a removable pin adapted to pass through said rolled ends to make a flexible band with a quick-release joint, and guides and adjustable securing means for detachably engaging and securing the ends of said band in adjusted overlapping relationship with each other, to form a tapered sleeve adapted for setting at different diameters at any of which the quick-release joint enables the sleeve to be opened and re-closed without disturbing the set dimension of the compressor and insuring uniform compression being exerted by the sleeve without requiring any further adjustment and without said quick release joint touching and interfering with the adjustable securing means.

3. In a piston ring compressor having the form of a tapered sleeve, the combination of an overlapped flexible band of two joined portions, interengaging rolled ends at one end of each portion and a removable pin adapted to pass through said rolled ends to form an independently operable quick-release joint, guides on the overlapped portions of the band, adjustable securing means for setting and securing the sleeve at different diameters consisting of a screwed stud secured to the overlapped inner portion of the band and located centrally of the width, a closed slot centrally located in the overlapping outer portion of the band parallel with its edges, through which slot the stud protrudes, a spring washer and a wing nut upon the stud, and said spring washer being shaped so as to be urged by the wing nut into gripping contact with the edges of the slotted end of the overlapping portion of the band, said quick release joint enabling the sleeve to be opened and reclosed without disturbing the set dimension of the compressor and insuring uniform compression being exerted by the sleeve without requiring any further adjustment when the parts are assembled.

HERMAN MARTIN.

REFERENCES CITED

The following references are of record in the file of this patent:

UNITED STATES PATENTS

| Number | Name | Date |
| --- | --- | --- |
| 182,893 | Clark | Oct. 3, 1876 |
| 1,013,349 | Whitty | Jan. 2, 1912 |
| 1,103,717 | Walton | July 14, 1914 |
| 1,573,579 | Ross | Feb. 16, 1926 |
| 1,663,084 | Ling | Mar. 20, 1928 |
| 1,678,622 | Horne | July 24, 1928 |
| 1,702,914 | Murphy | Feb. 19, 1929 |
| 2,037,096 | Sunnen | Apr. 14, 1936 |
| 2,041,850 | Melick | May 26, 1936 |

FOREIGN PATENTS

| Number | Country | Date |
| --- | --- | --- |
| 415,296 | Great Britain | Aug. 23, 1943 |
| 524,372 | France | May 11, 1921 |